(12) United States Patent
Park et al.

(10) Patent No.: US 10,370,496 B2
(45) Date of Patent: *Aug. 6, 2019

(54) POLYAMIC ACID RESIN AND POLYAMIDEIMIDE FILM

(71) Applicant: SK INNOVATION CO., LTD., Seoul (KR)

(72) Inventors: Sang Yoon Park, Daejeon (KR); Hyeon Jeong Kim, Daejeon (KR); Tae Sug Jang, Daejeon (KR); Jin Hyung Park, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,970

(22) Filed: Aug. 4, 2017

(65) Prior Publication Data

US 2018/0044476 A1 Feb. 15, 2018

(30) Foreign Application Priority Data

Aug. 11, 2016 (KR) .................. 10-2016-0102526
Jun. 23, 2017 (KR) .................. 10-2017-0079588

(51) Int. Cl.
*C08G 73/14* (2006.01)
*C08G 73/10* (2006.01)
*C08J 5/18* (2006.01)
*C09D 179/08* (2006.01)

(52) U.S. Cl.
CPC .......... *C08G 73/14* (2013.01); *C08G 73/1021* (2013.01); *C08G 73/1039* (2013.01); *C08G 73/1042* (2013.01); *C08G 73/1078* (2013.01); *C08J 5/18* (2013.01); *C09D 179/08* (2013.01); *C08J 2379/08* (2013.01)

(58) Field of Classification Search
CPC .. C08J 2379/08; C08G 73/14; C08G 73/1007; C08G 73/1042
See application file for complete search history.

(56) References Cited

U.S. PATENT DOCUMENTS

2015/0152232 A1* 6/2015 Ju .......................... C08J 5/18
524/442

FOREIGN PATENT DOCUMENTS

JP 2002-161136 A 6/2002

* cited by examiner

*Primary Examiner* — Gregory Listvoyb
(74) *Attorney, Agent, or Firm* — Hauptman Ham, LLP

(57) ABSTRACT

Provided are a polyamic acid resin, a polyamideimide film, and a method for preparing the same. More specifically, provided are a polyamic acid resin derived from a combination of specific components, and a polyamideimide film capable of implementing high modulus and excellent optical properties.

14 Claims, No Drawings

POLYAMIC ACID RESIN AND POLYAMIDEIMIDE FILM

CROSS-REFERENCE TO RELATED APPLICATIONS

This application claims priority under 35 U.S.C. § 119 to Korean Patent Application No. 10-2016-0102526, filed on Aug. 11, 2016, and Korean Patent Application No. 10-2017-0079588, filed on Jun. 23, 2017, in the Korean Intellectual Property Office, the disclosure of which is incorporated herein by reference in its entirety.

TECHNICAL FIELD

The following disclosure relates to a polyamic acid resin and a polyamideimide film. More specifically, the following disclosure relates to a polyamic acid resin derived from a combination of specific components, a polyamideimide film including polyamideimide resin derived from a combination of specific components so that high modulus and excellent optical properties are capable of being implemented, and a method for preparing the same.

BACKGROUND

In general, polyimide has been applied to various fields including insulating substrates for forming circuits and devices due to excellent mechanical properties and heat properties. However, since a charge transfer complex is formed between aromatic rings during polymerization, the polyimide is colored with brown or yellow color, and thus, a transmittance in a visible light region is low, which has difficulty in being applied to display materials.

As a method for preparing the polyimide to be colorless and transparent, a method for suppressing formation of the charge transfer complex in a molecule by using alicyclic diamine or aliphatic diamine as a diamine component has been known. Japanese Patent Laid-Open Publication No. 2002-161136 (Patent Document 1) discloses polyimide obtained by imidization of a polyimide precursor formed with an aromatic acid dianhydride such as pyromellitic dianhydride, etc., and trans-1,4-diaminocyclohexane. Even though the polyimide exhibits high transparency, there is a problem in that mechanical properties are deteriorated.

Further, it has been attempted to use various functional monomers as a method for converting the yellow color of polyimide into colorless transparency. However, there is difficulty in approaching the conversion due to problems in a preparation process, such as a rapid increase in viscosity during polymerization or difficulty in refining, etc., and even though transparency is secured, it is not sufficient to solve a problem that excellent mechanical properties inherent to polyimide are deteriorated.

Meanwhile, in the display material, research into a technology of replacing a cover glass for display with a polymer material has been conducted, and polyimide has received attention as a substitute for the cover glass.

Therefore, it is demanded to develop a technology for polyimide in which superior optical characteristics are exhibited to be applied to various display material fields including a material for replacing the cover glass, excellent inherent mechanical properties are not deteriorated, and in particular high modulus is implemented, thereby further broadening an application range.

RELATED ART DOCUMENT (Patent Document 1) Japanese Patent Laid-Open Publication No. 2002-161136 (Jun. 4, 2002)

SUMMARY

An embodiment of the present invention is directed to providing a polyamic acid resin capable of implementing high light transmittance not only in a visible light total wavelength region but also in a short wavelength region, and a low Yellow index while simultaneously implementing excellent mechanical properties inherent to polyimide, and a polyamideimide film including polyamideimide resin derived from a combination of specific components so that high modulus is capable of being implemented.

In one general aspect, a polyamideimide film includes: polyamideimide resin derived from aromatic diamine, acid anhydride, and aromatic diacid dichloride, wherein the aromatic diamine includes 2,2'-bis(trifluoromethyl)-benzidine, the acid anhydride includes aromatic dianhydride and cycloaliphatic dianhydride, and the aromatic diacid dichloride has a content of more than 50 mol with respect to 100 mol of the aromatic diamine.

The aromatic diacid dichloride may include any one or a mixture of two or more selected from the group consisting of terephthaloyl dichloride, isophthaloyl dichloride, 1,1'-biphenyl-4,4'-dicarbonyl dichloride, 1,4-naphthalene dicarboxylic dichloride, 2,6-naphthalene dicarboxylic dichloride, and 1,5-naphthalene dicarboxylic dichloride.

The aromatic dianhydride may be 4,4'-hexafluoroisopropylidene diphthalic anhydride, and the cycloaliphatic dianhydride may be cyclobutane tetracarboxylic dianhydride.

A molar ratio of the aromatic diacid dichloride to the aromatic dianhydride may be 2.50 to 7.00.

The aromatic diacid dichloride may have a content of 55 to 90 mol with respect to 100 mol of the aromatic diamine.

The polyamideimide film may have a modulus of 5.0 GPa or more, measured at an extension rate of 25 mm/min using UTM 3365 manufactured by Instron.

The polyamideimide film may have a total light transmittance of 88% or more, and a Yellow index, measured according to ASTM E313 standard, of 3.0 or less.

The polyamideimide film may have a light transmittance of 60% or more, measured at 388 nm.

The polyamideimide film may have a modulus of 5.0 GPa or more, measured at an extension rate of 25 mm/min using UTM 3365 manufactured by Instron, on a specimen having a thickness of 45 to 55 μm, a length of 50 mm, and a width of 10 mm.

The polyamideimide film may have a total light transmittance of 88% or more, and a Yellow index, measured according to ASTM E313 standard, of 3.0 or less, based on a thickness of 45 to 55 μm.

The polyamideimide film may have a light transmittance of 60% or more, measured at 388 nm.

In another general aspect, there is provided a polyamic acid resin derived from aromatic diamine, acid anhydride, and aromatic diacid dichloride, wherein the aromatic diamine includes 2,2'-bis(trifluoromethyl)-benzidine, the acid anhydride includes aromatic dianhydride and cycloaliphatic dianhydride, and the aromatic diacid dichloride has a content of more than 50 mol with respect to 100 mol of the aromatic diamine.

DETAILED DESCRIPTION OF EMBODIMENTS

Hereinafter, a polyamic acid resin, and a polyamideimide film according to the present invention are described in detail with reference to preferred embodiments. However, they are not intended to limit the protective scope defined by the claims of the present invention. Here, unless technical and scientific terms used herein are defined otherwise, they have meanings understood by those skilled in the art to which the present invention pertains.

Unless explicitly described to the contrary, the term "comprise" and variations such as "comprises" or "comprising" will be understood to further include other elements rather than excluding other elements throughout the specification.

In the present specification, "polyamic acid solution" is used in the same meaning as "polyamic acid resin composition".

Conventional polyimides have a problem in that a charge transfer complex (CTC) structure is formed due to occurrence of polymer chain packing, thereby remarkably lowering short wavelength transmittance.

The present inventors surprisingly found that a polyamic acid resin derived from a combination of specific diamine, acid anhydride, and aromatic diacid dichloride, and a polyamideimide film formed using the same could exhibit a remarkably low Yellow index, high light transmittance throughout a visible light region, particularly, excellent light transmittance even in a short wavelength region of 410 nm or less, specifically 200 to 410 nm, preferably 370 to 410 nm, and more preferably 370 to 390 nm to thereby implement excellent optical properties while simultaneously implementing excellent mechanical strength including high modulus, and completed the present invention.

Specifically, in order to provide a resin and a film capable of having excellent mechanical properties, heat properties, and electrical properties, and remarkably improved optical properties to be applicable to various fields including a display devices, etc., the present invention provides a polyamic acid resin derived from a combination of specific aromatic diamine, acid anhydride including aromatic dianhydride and cycloaliphatic dianhydride, and aromatic diacid dichloride, a polyamideimide film, and a method for preparing the same.

The specific aromatic diamine may be an aromatic diamine into which a fluorine substituent is introduced. More preferably, the aromatic diamine may be 2,2'-bis(trifluoromethyl)-benzidine. The aromatic diamine may provide excellent optical properties due to a charge transfer effect of the fluorine substituents. In addition, it is possible to dramatically improve the optical properties such as high light transmittance and a low Yellow index, etc., and to implement high modulus in physical properties of the polyamideimide film formed by using the polyamic acid resin derived from a combination with other monomers.

In the present invention, the aromatic diamine component of the polyamic acid resin may be used in combination with known aromatic diamine components other than 2,2'-bis(trifluoromethyl)-benzidine. However, the use of 2,2'-bis(trifluoromethyl)-benzidine alone is more preferable to implement an effect to be achieved.

In the present invention, the acid anhydride includes aromatic dianhydride and cycloaliphatic dianhydride.

The aromatic dianhydride is not largely limited, but for example, may be any one or a mixture of two or more selected from the group consisting of 4,4'-hexafluoroisopropylidene diphthalic anhydride (6FDA), 1,2,4,5-benzenetetracarboxylic dianhydride (PMDA), biphenyl tetracarboxylic dianhydride (BPDA), benzophenone tetracarboxylic dianhydride (BTDA), 4,4'-oxydiphthalic dianhydride (ODPA), and bisdicarboxyphenoxy diphenylsulfide dianhydride (BDSDA). More preferably, 4,4'-hexafluoroisopropylidene diphthalic anhydride (6FDA) is more preferable to implement desired physical properties.

Further, the aromatic dianhydride may have a content of 10 to 35 mol, preferably 10 to 30 mol, with respect to 100 mol of the aromatic diamine, in implementing physical properties.

In the present invention, the cycloaliphatic dianhydride is differentiated from the aromatic dianhydride. It is possible to use the cycloaliphatic dianhydride alone, but more preferably, by combining the cycloaliphatic dianhydride with the aromatic dianhydride, a synergistic effect of the desired physical properties may be implemented.

The cycloaliphatic dianhydride is not largely limited, but may be, for example, any one or a mixture of two or more selected from the group consisting of 1,2,3,4-cyclobutane tetracarboxylic dianhydride (CBDA), 5-(2,5-dioxotetrahydrofuryl)-3-methylcyclohexene-1,2-dicarboxylic dianhydride (DOCDA), bicyclooctene-2,3,5,6-tetracarboxylic dianhydride (BODA), 1,2,3,4-cyclopentane tetracarboxylic dianhydride (CPDA), 1,2,4,5-cyclohexane tetracarboxylic dianhydride (CHDA), 1,2,4-tricarboxy-3-methylcarboxycyclopentane dianhydride, and 1,2,3,4-tetracarboxycyclopentane dianhydride. More preferably, the cyclobutane tetracarboxylic dianhydride is more preferably used in implementing desired physical properties.

Further, the cycloaliphatic dianhydride may have a content of 5 to 35 mol, preferably 10 to 35 mol, with respect to 100 mol of the aromatic diamine, in implementing physical properties.

In the present invention, the aromatic diacid dichloride forms an amide structure in a polymer chain, and may improve mechanical properties including modulus within a range in which optical properties are not deteriorated.

The aromatic diacid dichloride is not largely limited, but for example, may be any one or a mixture of two or more selected from the group consisting of terephthaloyl dichloride (TPC), isophthaloyl dichloride (IPC), 1,1'-biphenyl-4,4'-dicarbonyl dichloride (BPC), 1,4-naphthalene dicarboxylic dichloride, 2,6-naphthalene dicarboxylic dichloride, and 1,5-naphthalene dicarboxylic dichloride. When the mixture of two or more thereof is used, terephthaloyl dichloride is preferably included. More preferably, the use of terephthaloyl dichloride alone is more preferable since it is possible to simultaneously improve physical properties of mechanical strength, light transmittance not only in the entire visible light region but also in the short wavelength region, and a Yellow index.

Further, the aromatic diacid dichloride is not limited to the above-exemplified compounds, and may be further used by mixing with other acid halide compounds, but it is preferable to use the aromatic diacid dichloride alone.

The aromatic diacid dichloride may have a content of more than 50 mol with respect to 100 mol of the aromatic diamine. By copolymerizing a high content of aromatic diacid dichloride, a film prepared therefrom may have remarkably improved mechanical properties and optical properties, and at the same time, may implement a high modulus.

In particular, the aromatic diacid dichloride has difficulty in being used in a high percentage content of more than 50 mol based on diamine due to problems such as gelation, etc., during the polymerization reaction. Thus, according to the related art, in order to use the high content of aromatic diacid dichloride, lithium chloride, calcium chloride, or the like, is used together. However, there are problems in that chlorine ions are left, which adversely affects the environment or deteriorates physical properties of the film. In order to solve the problems, the present invention includes a method for adjusting a composition ratio according to combination with other components including cycloaliphatic dianhydride, reaction sequence of reaction components, and a polymerization concentration, thereby remarkably increasing the content of the aromatic diacid dianhydride, and as a result, desired physical properties may be achieved.

The aromatic diacid dichloride may have a content of 55 to 90 mol, preferably 55 to 80 mol, and more preferably 55 to 75 mol, with respect to 100 mol of the aromatic diamine.

When the above-described range is satisfied, it is possible to implement high light transmittance over the entire visible light region, and further, to implement excellent light transmittance even in a short wavelength region of 410 nm or less, without deteriorating desired balance of physical properties, that is, mechanical properties and heat properties, by a combination with other components. In particular, the Yellow index may be further reduced while simultaneously implementing high light transmittance, and a synergistic effect that is capable of remarkably improving the modulus may be implemented.

The polyamic acid resin according to an exemplary embodiment of the present invention is derived from aromatic diamine, acid anhydride, and aromatic diacid dichloride, wherein the aromatic diamine may include 2,2'-bis(trifluoromethyl)-benzidine, the acid anhydride may include aromatic dianhydride and cycloaliphatic dianhydride, and the aromatic diacid dichloride may have a content of more than 50 mol with respect to 100 mol of the aromatic diamine.

In the present invention, the polyamic acid resin may preferably be a resin in which an oligomer derived from the aromatic diamine and the acid anhydride, and the aromatic diacid dichloride are copolymerized.

An equivalence ratio of a mixture of the aromatic diamine and the acid anhydride, and the aromatic diacid dichloride in the present invention is preferably 0.9:1 to 1.1:1, and more preferably, 1:1. When the above-described range is satisfied, it is more preferable in that physical properties of the film including film-forming properties are improved when the film is molded from polyamideimide resin which is obtained by imidization of the polyamic acid resin derived from the monomers.

The polyamic acid solution refers to a solution of the above-described monomers, and includes an organic solvent for a solution polymerization reaction. The organic solvent is not largely limited in view of a kind, and preferably, may be, for example, any one or two or more polar solvents selected from dimethylacetamide (DMAc), N-methyl-2-pyrrolidone (NMP), dimethylformamide (DMF), dimethylformsulfoxide (DMSO), acetone, diethyl acetate, m-cresol, etc.

The polyamic acid solution including the polyamic acid resin and the solvent in the present invention may be imidized by further including any one or two or more selected from an imidization catalyst and a dehydrating agent in addition to the polyamic acid resin.

The imidization catalyst may be any one or more selected from pyridine, isoquinoline, and β-quinoline. In addition, the dehydrating agent may be any one or more selected from acetic anhydride, phthalic anhydride, and maleic anhydride, but is not necessarily limited thereto.

According to the present invention, the polyamideimide film may be obtained by imidizing the above-described polyamic acid solution. Here, the imidization may be performed by known imidization methods. Preferably, it is preferable to perform chemical imidization. More preferably, the polyamic acid solution is chemically imidized using pyridine and acetic anhydride.

The polyamic acid solution according to the present invention may further include various types of additives. The additive may be any one or two or more selected from a flame retardant, an adhesion promoter, an inorganic particle, an antioxidant, a ultraviolet ray inhibitor, a plasticizer, an antistatic agent, etc., but the additive is not necessarily limited thereto.

In addition, the present invention provides an image display device including the above-described polyamideimide film.

Further, the present invention may provide polyamideimide resin which is an imide of the above-described polyamic acid resin.

The present invention provides a method for preparing a polyamideimide film including:

(a) preparing a polyamic acid solution by dissolving aromatic diamine containing 2,2'-bis(trifluoromethyl)-benzidine in an organic solvent, and adding acid anhydride including aromatic dianhydride and cycloaliphatic dianhydride, and aromatic diacid dichloride having a content of more than 50 mol with respect to 100 mol of the aromatic diamine, followed by reacting, (b) preparing polyamideimide resin by imidization of the polyamic acid solution, and (c) applying a polyamideimide solution in which the polyamideimide resin is dissolved in the organic solvent.

In the present invention, the method for preparing the polyamideimide film is not largely limited, but it is preferably performed by using a reactor equipped with a stirrer, a nitrogen injection device, a dropping device, a thermoregulator, and a cooler.

Step (a) of preparing the polyamic acid solution according to an exemplary embodiment may be performed by adding an organic solvent to a reactor to dissolve aromatic diamine, followed by reacting with acid anhydride including aromatic dianhydride and cycloaliphatic dianhydride, and then, adding aromatic diacid dichloride, followed by reacting.

Further, step (a) of preparing the polyamic acid solution according to another exemplary embodiment may be performed by adding an organic solvent to a reactor to dissolve aromatic diamine, followed by reacting with aromatic diacid dichloride, and reacting with acid anhydride including aromatic dianhydride and cycloaliphatic dianhydride. It is more preferable in that the content of the aromatic diacid dichloride in the finally obtained polymer may be increased, even though a polymerization concentration, that is, a solid content is high, uniformity of the polymerization reaction may be excellent, and high modulus may be implemented in addition to excellent optical properties.

At the time of preparing the polyamic acid solution, the monomers may be added in a stepwise manner rather than adding the monomers to the organic solvent at a time, thereby increasing reactivity of the aromatic diamine. Further, it is preferable that the aromatic diamine is preferentially added to the organic solvent and is sufficiently dissolved. Here, the organic solvent to be used is the same as described above, preferably, dimethylacetamide or N-methyl-2-pyrrolidone. Further, a content of the organic solvent may be appropriately selected in consideration of a molecular weight of the polyamideimide resin which is a copolymer derived from the monomers, and may be 80 to 97 wt % of the total content of the composition. Preferably, the content of the organic solvent may be 85 to 95 wt %, and more preferably, 87 to 95 wt %. That is, a solid content may be 3 to 20 wt %, preferably 5 to 15 wt %, and more preferably 5 to 13 wt %.

When the content of the organic solvent is less than 80 wt %, gelation may occur in the polymerization process, it may be difficult to obtain a uniform solution, and purification using the solvent may not be easily performed since a high viscosity solution beyond the usable range is formed. When the purification is not properly performed as described above, optical physical properties such as light transmittance, Yellow index, etc., may be deteriorated when the film is formed. In addition, when the content of the organic solvent is more than 97 wt %, the solution may be formed, but a yield of the polyamideimide resin may be reduced.

In step (a), the aromatic diacid dichloride may have a content of more than 50 mol, preferably 55 to 90 mol, preferably 55 to 80 mol, and more preferably 55 to 75 mol, based on 100 mol of the aromatic diamine.

Here, preferably, by adjusting a molar ratio of the aromatic diacid dichloride to the aromatic dianhydride, it is possible to further improve not only total light transmittance but also light transmittance in a short wavelength region, and a Yellow index, and in particular, a modulus property. Specifically, a molar ratio of the aromatic diacid dichloride to the aromatic dianhydride may be 2.50 or more. Specifically, the molar ratio of the aromatic diacid dichloride to the aromatic dianhydride, that is, the aromatic diacid dichloride/the aromatic dianhydride may be 2.50 to 7.00, more preferably 2.65 to 6.50, and most preferably 2.75 to 6.10. When the molar ratio thereof is out of the above-described range, it is difficult to prepare a film having uniform physical properties, or the prepared film may not implement desired physical properties.

Step (a) is preferably performed under an inert gas atmosphere, and for example, is performed under reflux with nitrogen or argon gas in the reactor. In addition, the reaction may be performed at room temperature to 80° C., specifically, 20° C. to 80° C., for 30 minutes to 24 hours, but the reaction temperature range and the reaction time are not necessarily limited thereto.

The imidization in step (b) is a step of imidizing the polyamic acid solution prepared in step (a) to obtain polyamideimide resin, wherein known imidization methods, for example, a heat imidization method, a chemical imidization method, a combination of the heat imidization method and the chemical imidization method may be applied. Preferably, the chemical imidization method is preferable, but the imidization is not limited thereto.

Further, the imidization may be performed before the polyamideimide solution is applied, or may be performed after the polyamideimide solution is applied, and the imidization is not limited since it may be applied by various known methods.

In the present invention, the chemical imidization may be performed by further including any one or two or more selected from the imidization catalyst and the dehydrating agent to the prepared polyamic acid solution. When the chemical imidization is performed by adding any one or two or more selected from the imidization catalyst and the dehydrating agent to the polyamic acid solution prepared in step (a), it is more preferable in view of physical properties of the polyamideimide resin to be obtained. More preferably, any one or two or more selected from the imidization catalyst and the dehydrating agent may be added to the polyamic acid solution, followed by imidization and purification using a solvent, thereby obtaining a solid, and the solid may be dissolved in a solvent to obtain a polyamideimide solution.

Here, the dehydrating agent may be any one or more selected from acetic anhydride, phthalic anhydride, and maleic anhydride. The imidization catalyst may be any one or more selected from pyridine, isoquinoline, and β-quinoline. However, the dehydrating agent and the imidization catalyst are not limited thereto.

At the time of purifying the polyamic acid solution or polyamineimde solution, the solvent is preferably a solvent in which solubility of the polyamic acid resin or the polyamideimide resin solid is significantly reduced, and for example, the solvent is preferably any one or more selected from water and alcohol.

The solvent used at the time of obtaining the polyamideimide resin imidized by dissolving the obtained solid in the solvent may be the same as the organic solvent used in the preparation of the polyamic acid solution. Here, the solvent may have a content of 70 to 95 wt %. Preferably, the content of the solvent may be 75 to 95 wt %, more preferably, 80 to 90 wt %.

In addition, a viscosity of the polyamideimide solution obtained by dissolving the finally obtained polyamideimide resin in the solvent may be 5,000 to 500,000 cps, preferably, 8,000 to 300,000 cps, and more preferably, 10,000 to 200,000 cps. Here, the viscosity is measured at 25° C. using a Brookfield viscometer.

The polyamideimide resin obtained in the present invention may have a weight average molecular weight of 50,000 to 1,000,000 g/mol, preferably 50,000 to 800,000 g/mol, and more preferably 50,000 to 500,000 g/mol. Here, the weight average molecular weight is measured by 1260 Infinity manufactured by Agilent Technologies, using polystyrene as a standard specimen, wherein PL gel Olexis is used as a column, and the specimen has a content of 4 mg in 100 ml of LiCl (concentration: 0.5 wt %) with DMAc as a solvent. Further, the polyamideimide resin may have a glass transition temperature of 200 to 400° C., and preferably 320 to 390° C.

The method may further include (c) applying a polyamideimide solution in which the polyamideimide resin is dissolved in the solvent, followed by heat treatment. The heat treatment is a step of casting the polyamideimide solution on a support such as a glass substrate, or the like, followed by heat treatment to mold a film. Here, the term "polyamideimide solution" which describes step (c) means a coating composition for preparing the polyamideimide film containing polyamideimide resin.

The heat treatment is preferably performed stepwise in an exemplary embodiment. The heat treatment may be preferably performed by a stepwise heat treatment at 80 to 100° C. for 1 minute to 2 hours, at 100 to 200° C. for 1 minute to 2 hours, and at 250 to 300° C. for 1 minute to 2 hours. More preferably, the stepwise heat treatment according to each temperature range is performed for 30 minutes to 2 hours. Here, it is more preferable that the stepwise heat treatment is performed by raising a temperature at a range of 1 to 20° C./min when moved to each step. In addition, the heat treatment may be performed in a separate vacuum oven, but is not necessarily limited thereto.

The application may be performed to mold the film on the support using an applicator in consideration of a thickness of the film to be prepared. The film may have a thickness of 10 to 100 μm, preferably, 20 to 90 μm, but the thickness thereof is not limited thereto.

The polyamideimide film according to an exemplary embodiment of the present invention may have a modulus of 5.0 Gpa or more, more preferably, 5.4 GPa or more, specifically, 5.0 to 10 GPa, and preferably, 5.4 to 9 GPa, measured by pulling a specimen at 25 mm/min, using UTM 3365 manufactured by Instron. Here, the modulus may be measured based on a specimen having a thickness of 45 to 55 μm, a length of 50 mm, and a width of 10 mm.

Further, the polyamideimide film may have a total light transmittance of 88% or more, specifically, 88 to 99%, and preferably, 88 to 95%, measured using a Nippon Denshoku 300 instrument as a UV-visible spectrophotometer. Here, the total light transmittance may be measured in the entire wavelength region of 400 to 700 nm as an example.

Further, the polyamideimide film may have a short wavelength light transmittance of 60% or more, specifically, 60 to 80%, preferably, 65 to 80%, and more preferably, 68 to 75%, measured at 388 nm.

In addition, the polyamideimide film may have a Yellow index of 3.0 or less, preferably 2.4 or less, and more preferably, 2.3 or less, measured according to ASTM E313 standard using ColorQuest XE (Mode type: Total transmission, Area view: 0.375 in., UV filter: Nominal) manufactured by HunterLab. Specifically, the Yellow index may be 1.0 to 3.0, preferably 1.0 to 2.4, and more preferably, 1.0 to 2.3 or less. The physical properties, specifically, the light transmittance and the Yellow index may be measured on the basis of a polyamideimide film having a thickness of 45 to 55 μm.

The polyamideimide film capable of realizing excellent physical properties as described above may be derived from aromatic diamine, acid anhydride, and aromatic diacid dichloride. Further, the aromatic diamine may include 2,2'-bis(trifluoromethyl)-benzidine, and the acid anhydride may include aromatic dianhydride and cycloaliphatic dianhydride. Further, the aromatic diacid dichloride may have a content of more than 50 mol with respect to 100 mol of the aromatic diamine. The polyamideimide film prepared by such a combination may implement an excellent modulus as well as optical properties such as excellent light transmittance, a low Yellow index, etc., not only in a visible light total wavelength region as described above but also in a short wavelength region.

In the present invention, various types of molded articles may be manufactured by using the above-described polyamideimide resin. For example, the polyamideimide resin may be applied to a printed circuit board including a film, a protective film or an insulating film, a flexible circuit board, etc., but is not limited thereto. Preferably, the polyamideimide film may be applied to a protective film capable of replacing a cover glass, and thus, may have a wide range of applications in various industrial fields including a display.

Hereinafter, exemplary embodiments of the present invention have been disclosed for illustrative purposes in detail, and thus, the present invention is not limited to the following Examples.

Physical properties of the present invention were measured as follows.

(1) Light Transmittance (Unit: %)

Total light transmittance measured over the entire wavelength region of 400 to 700 nm in each of the films prepared in the Examples and Comparative Examples were measured by using a Nippon Denshoku 300 instrument according to ASTM E313 standard.

(2) Uniformity of Polymerization Reaction

All of a solvent for polymerization and a reaction material were added to perform a polymerization reaction. After 24 hours of the polymerization reaction, a case where uniformity of the polymerization reaction was good was marked with o, and a case where uniformity of the polymerization reaction was not good was marked with X, except for a case where gelation occurred so that stirring was no longer possible based on the stirrer, or except for a case where an insoluble solid with transparent color was found, wherein the insoluble solid was not filtered on a 80 mesh after diluting the obtained solution 100 CPS using a solvent used in the polymerization and filtering the resulting solution through the mesh.

(3) Yellow Index

The Yellow index of each of the films prepared in the Examples and Comparative Examples was measured using HunterLab's ColorQuest XE (Mode type: Total transmission, Area view: 0.375 in., UV filter: Nominal) according to ASTM E313 standard.

(4) Modulus

The modulus was measured by pulling each of the films having a length of 50 mm and a width of 10 mm prepared in the Examples and Comparative Examples at 25° C. at 25 mm/min, using UTM 3365 manufactured by Instron.

(5) Viscosity

The viscosity was measured at 25° C. using a Brookfield viscometer (Dv2TRV-cone&plate, CPA-52Z).

Example 1

N,N-dimethylacetamide (DMAc) and 2,2'-bis(trifluoromethyl)-benzidine (TFMB) were added to a reactor under a nitrogen atmosphere, and the mixture was thoroughly stirred. Then, 4,4'-hexafluoroisopropylidene diphthalic anhydride (6FDA) was added thereto and stirred well until dissolved, and then, cyclobutane tetracarboxylic dianhydride (CBDA) was added thereto and stirred well until dissolved. Then, terephthaloyl dichloride (TPC) was added thereto, and stirred for 6 hours, followed by dissolution and reaction, thereby preparing a polyamic acid resin composition. Here, an amount of each monomer was adjusted so that a molar ratio of TFMB:6FDA:CBDA:TPC was 100:20:10:70 as shown in a composition ratio of Table 1 below, a solid content was adjusted to be 6 wt %, and a temperature of the reactor was maintained at 30° C. Next, pyridine and acetic anhydride in a content of 2.5 times more than the total molar content of dianhydride were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 180,000 g/mol, and the finally obtained polyamideimide had a viscosity of 48,000 cps, measured at 25° C. using a Brookfield viscometer after diluting the polyamideimide to 12 wt % with N,N-dimethylacetamide (DMAc).

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 47 μm.

Example 2

N,N-dimethylacetamide (DMAc) and 2,2'-bis(trifluoromethyl)-benzidine (TFMB) were added to a reactor under a nitrogen atmosphere, and the mixture was thoroughly stirred. Then, 4,4'-hexafluoroisopropylidene diphthalic anhydride (6FDA) was added thereto and stirred well until dissolved, and then, cyclobutane tetracarboxylic dianhydride (CBDA) was added thereto and stirred well until dissolved. Then, terephthaloyl dichloride (TPC) was added thereto, and stirred for 6 hours, followed by dissolution and reaction, thereby preparing a polyamic acid resin composition. Here, an amount of each monomer was adjusted so that a molar ratio of TFMB:6FDA:CBDA:TPC was 100:15:15:70 as shown in a composition ratio of Table 1 below, a solid content was adjusted to be 6 wt %, and a temperature of the reactor was maintained at 30° C. Next, pyridine and acetic anhydride in a content of 2.5 times more than the total molar content of dianhydride were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 210,000 g/mol, and the finally obtained polyamideimide had a viscosity of 51,000 cps, measured at 25° C. using a Brookfield viscometer after diluting the polyamideimide to 12 wt % with N,N-dimethylacetamide (DMAc).

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 53 μm.

Example 3

N,N-dimethylacetamide (DMAc) and 2,2'-bis(trifluoromethyl)-benzidine (TFMB) were added to a reactor under a nitrogen atmosphere, and the mixture was thoroughly stirred. Then, 4,4'-hexafluoroisopropylidene diphthalic anhydride (6FDA) was added thereto and stirred well until dissolved, and then, cyclobutane tetracarboxylic dianhydride (CBDA) was added thereto and stirred well until dissolved. Then, terephthaloyl dichloride (TPC) was added thereto, and stirred for 6 hours, followed by dissolution and reaction, thereby preparing a polyamic acid resin composition. Here, an amount of each monomer was adjusted so that a molar ratio of TFMB:6FDA:CBDA:TPC was 100:20:20:60 as shown in a composition ratio of Table 1 below, a solid content was adjusted to be 6 wt %, and a temperature of the reactor was maintained at 30° C. Next, pyridine and acetic anhydride in a content of 2.5 times more than the total molar content of dianhydride were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 180,000 g/mol, and the finally obtained polyamideimide had a viscosity of 33,000 cps, measured at 25° C. using a Brookfield viscometer after diluting the polyamideimide to 12 wt % with N,N-dimethylacetamide (DMAc).

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 50 μm.

Example 4

N,N-dimethylacetamide (DMAc) and 2,2'-bis(trifluoromethyl)-benzidine (TFMB) were added to a reactor under a nitrogen atmosphere, and the mixture was thoroughly stirred. Then, 4,4'-hexafluoroisopropylidene diphthalic anhydride (6FDA) was added thereto and stirred well until dissolved, and then, cyclobutane tetracarboxylic dianhydride (CBDA) was added thereto and stirred well until dissolved. Then, terephthaloyl dichloride (TPC) was added thereto, and stirred for 6 hours, followed by dissolution and reaction, thereby preparing a polyamic acid resin composition. Here, an amount of each monomer was adjusted so that a molar ratio of TFMB:6FDA:CBDA:TPC was 100:15:30:55 as shown in a composition ratio of Table 1 below, a solid content was adjusted to be 6 wt %, and a temperature of the reactor was maintained at 30° C. Next, pyridine and acetic anhydride in a content of 2.5 times more than the total molar content of dianhydride were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 230,000 g/mol, and the finally obtained polyamideimide had a viscosity of 58,000 cps, measured at 25° C. using a Brookfield viscometer after diluting the polyamideimide to 12 wt % with N,N-dimethylacetamide (DMAc).

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 47 μm.

Example 5

N,N-dimethylacetamide (DMAc) and 2,2'-bis(trifluoromethyl)-benzidine (TFMB) were added to a reactor under a nitrogen atmosphere, and the mixture was thoroughly stirred. Then, 4,4'-hexafluoroisopropylidene diphthalic anhydride (6FDA) was added thereto and stirred well until dissolved, and then, cyclobutane tetracarboxylic dianhydride (CBDA) was added thereto and stirred well until dissolved. Then, terephthaloyl dichloride (TPC) was added thereto, and stirred for 6 hours, followed by dissolution and reaction, thereby preparing a polyamic acid resin composition. Here, an amount of each monomer was adjusted so that a molar ratio of TFMB:6FDA:CBDA:TPC was 100:20:25:55 as shown in a composition ratio of Table 1 below, a solid content was adjusted to be 6 wt %, and a temperature of the reactor was maintained at 30° C. Next, pyridine and acetic anhydride in a content of 2.5 times more than the total molar content of dianhydride were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 200,000 g/mol, and the finally obtained polyamideimide had a viscosity of 45,000 cps, measured at 25° C. using a Brookfield viscometer after diluting the polyamideimide to 12 wt % with N,N-dimethylacetamide (DMAc).

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 49 µm.

Example 6

N,N-dimethylacetamide (DMAc) and 2,2'-bis(trifluoromethyl)-benzidine (TFMB) were added to a reactor under a nitrogen atmosphere, and the mixture was thoroughly stirred. Then, 4,4'-hexafluoroisopropylidene diphthalic anhydride (6FDA) was added thereto and stirred well until dissolved, and then, cyclobutane tetracarboxylic dianhydride (CBDA) was added thereto and stirred well until dissolved. Then, terephthaloyl dichloride (TPC) was added thereto, and stirred for 6 hours, followed by dissolution and reaction, thereby preparing a polyamic acid resin composition. Here, an amount of each monomer was adjusted so that a molar ratio of TFMB:6FDA:CBDA:TPC was 100:15:10:75 as shown in a composition ratio of Table 1 below, a solid content was adjusted to be 6 wt %, and a temperature of the reactor was maintained at 30° C. Next, pyridine and acetic anhydride in a content of 2.5 times more than the total molar content of dianhydride were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 200,000 g/mol, and the finally obtained polyamideimide had a viscosity of 77,000 cps, measured at 25° C. using a Brookfield viscometer after diluting the polyamideimide to 12 wt % with N,N-dimethylacetamide (DMAc).

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 50 µm.

Example 7

N,N-dimethylacetamide (DMAc) and 2,2'-bis(trifluoromethyl)-benzidine (TFMB) were added to a reactor under a nitrogen atmosphere, and the mixture was thoroughly stirred. Then, 4,4'-hexafluoroisopropylidene diphthalic anhydride (6FDA) was added thereto and stirred well until dissolved, and then, cyclobutane tetracarboxylic dianhydride (CBDA) was added thereto and stirred well until dissolved. Then, terephthaloyl dichloride (TPC) was added thereto, and stirred for 6 hours, followed by dissolution and reaction, thereby preparing a polyamic acid resin composition. Here, an amount of each monomer was adjusted so that a molar ratio of TFMB:6FDA:CBDA:TPC was 100:12:15:73 as shown in a composition ratio of Table 1 below, a solid content was adjusted to be 6 wt %, and a temperature of the reactor was maintained at 30° C. Next, pyridine and acetic anhydride in a content of 2.5 times more than the total molar content of dianhydride were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 195,000 g/mol, and the finally obtained polyamideimide had a viscosity of 75,000 cps, measured at 25° C. using a Brookfield viscometer after diluting the polyamideimide to 12 wt % with N,N-dimethylacetamide (DMAc).

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 50 µm.

Example 8

Methylene chloride and 2,2'-bis(trifluoromethyl)-benzidine (TFMB) were added to a reactor under a nitrogen atmosphere, and the mixture was thoroughly stirred. Then, terephthaloyl dichloride (TPC) was added thereto and stirred for 6 hours, followed by dissolution and reaction. Then, a reaction product obtained by precipitation and filtration using an excessive content of methanol was vacuum-dried at 50° C. for 6 hours or more, and to the reaction product, DMAc was added together therewith and dissolved in the reactor under a nitrogen atmosphere. Then, 4,4'-hexafluoroisopropylidene diphthalic anhydride (6FDA) was added thereto and stirred well until dissolved, and then, cyclobutane tetracarboxylic dianhydride (CBDA) was added thereto and stirred well until dissolved. Next, pyridine and acetic anhydride in a content of 2.5 times more than the total molar content of cyclobutane tetracarboxylic dianhydride (CBDA) were added to the solution, and stirred at 60° C. for 1 hour Here, an amount of each monomer was adjusted so that a molar ratio of TFMB:6FDA:CBDA:TPC was 100:15:15:70 as shown in a composition ratio of Table 1 below, and the solution was adjusted to have a solid content of 15 wt %. The finally obtained polyamideimide had a viscosity of 173,000 cps, measured at 25° C. using a Brookfield viscometer after diluting the polyamideimide to 12 wt % with N,N-dimethylacetamide (DMAc).

The obtained solution was subjected to solution casting on a glass substrate using an applicator. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 48 μm. A weight average molecular weight of the film was measured to be 264,000 g/mol.

Comparative Example 1

N,N-dimethylacetamide (DMAc) and 2,2'-bis(trifluoromethyl)-benzidine (TFMB) were added to a reactor under a nitrogen atmosphere, and the mixture was thoroughly stirred. Then, 4,4'-hexafluoroisopropylidene diphthalic anhydride (6FDA) was added thereto and stirred well until dissolved, and then, cyclobutane tetracarboxylic dianhydride (CBDA) was added thereto and stirred well until dissolved. Then, terephthaloyl dichloride (TPC) was added thereto, and stirred for 6 hours, followed by dissolution and reaction, thereby preparing a polyamic acid resin composition. Here, an amount of each monomer was adjusted so that a molar ratio of TFMB:6FDA:CBDA:TPC was 100:30:20:50 as shown in a composition ratio of Table 1 below, a solid content was adjusted to be 6 wt %, and a temperature of the reactor was maintained at 30° C. Next, pyridine and acetic anhydride in a content of 2.5 times more than the total molar content of dianhydride were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 140,000 g/mol, and the finally obtained polyamideimide had a viscosity of 37,000 cps, measured at 25° C. using a Brookfield viscometer after diluting the polyamideimide to 12 wt % with N,N-dimethylacetamide (DMAc).

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 50 μm.

Comparative Example 2

N,N-dimethylacetamide (DMAc) and 2,2'-bis(trifluoromethyl)-benzidine (TFMB) were added to a reactor under a nitrogen atmosphere, and the mixture was thoroughly stirred. Then, 4,4'-hexafluoroisopropylidene diphthalic anhydride (6FDA) was added thereto and stirred well until dissolved, and then, cyclobutane tetracarboxylic dianhydride (CBDA) was added thereto and stirred well until dissolved. Then, terephthaloyl dichloride (TPC) was added thereto, and stirred for 6 hours, followed by dissolution and reaction, thereby preparing a polyamic acid resin composition. Here, an amount of each monomer was adjusted so that a molar ratio of TFMB:6FDA:CBDA:TPC was 100:25:35:40 as shown in a composition ratio of Table 1 below, a solid content was adjusted to be 6 wt %, and a temperature of the reactor was maintained at 30° C. Next, pyridine and acetic anhydride in a content of 2.5 times more than the total molar content of dianhydride were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 195,000 g/mol, and the finally obtained polyamideimide had a viscosity of 54,000 cps, measured at 25° C. using a Brookfield viscometer after diluting the polyamideimide to 12 wt % with N,N-dimethylacetamide (DMAc).

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 54 μm.

Comparative Example 3

N,N-dimethylacetamide (DMAc) and 2,2'-bis(trifluoromethyl)-benzidine (TFMB) were added to a reactor under a nitrogen atmosphere, and the mixture was thoroughly stirred. Then, 4,4'-hexafluoroisopropylidene diphthalic anhydride (6FDA) was added thereto and stirred well until dissolved, and then, cyclobutane tetracarboxylic dianhydride (CBDA) was added thereto and stirred well until dissolved. Then, isophthaloyl dichloride (IPC) was added thereto, and stirred for 6 hours, followed by dissolution and reaction, thereby preparing a polyamic acid resin composition. Here, an amount of each monomer was adjusted so that a molar ratio of TFMB:6FDA:CBDA:IPC was 100:20:35:45 as shown in a composition ratio of Table 1 below, a solid content was adjusted to be 6 wt %, and a temperature of the reactor was maintained at 30° C. Next, pyridine and acetic anhydride in a content of 2.5 times more than the total molar content of dianhydride were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 120,000 g/mol, and the finally obtained polyamideimide had a viscosity of 17,000 cps, measured at 25° C. using a Brookfield viscometer after diluting the polyamideimide to 12 wt % with N,N-dimethylacetamide (DMAc).

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 49 μm.

Comparative Example 4

N,N-dimethylacetamide (DMAc) and 2,2'-bis(trifluoromethyl)-benzidine (TFMB) were added to a reactor under a nitrogen atmosphere, and the mixture was thoroughly stirred. Then, 4,4'-hexafluoroisopropylidene diphthalic anhydride (6FDA) was added thereto and stirred well until dissolved, and then, cyclobutane tetracarboxylic dianhydride (CBDA) was added thereto and stirred well until dissolved. Here, an amount of each monomer was adjusted so that a molar ratio of TFMB:6FDA:CBDA was 100:60:40 as shown in a composition ratio of Table 1 below, a solid content was adjusted to be 6 wt %, and a temperature of the reactor was maintained at 30° C. Next, pyridine and acetic anhydride in a content of 2.5 times more than the total molar content of dianhydride were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 108,000 g/mol, and the finally obtained polyamideimide had a viscosity of 12,000 cps, measured at 25° C. using a Brookfield viscometer after diluting the polyamideimide to 12 wt % with N,N-dimethylacetamide (DMAc).

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature. The film formed on the glass an amount of each monomer was adjusted so that a molar ratio of TFMB:6FDA:BPDA:TPC was 100:20:20:60 as shown in a composition ratio of Table 1 below, a solid content was adjusted to be 12 wt %, and a temperature of the reactor was maintained at 30° C. Next, pyridine and acetic anhydride in a content of 2.5 times more than the total molar content of dianhydride were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder. The obtained polyamideimide powder had a weight average molecular weight of 195,000 g/mol, and the finally obtained polyamideimide had a viscosity of 54,000 cps, measured at 25° C. using a Brookfield viscometer after diluting the polyamideimide to 12 wt % with N,N-dimethylacetamide (DMAc).

12 g of the obtained polyamideimide powder was dissolved in 88 g of N,N-dimethylacetamide (DMAc), and then, solution casting was performed on a glass substrate using an applicator. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 55 μm.

TABLE 1

| | Composition ratio (molar ratio) | | | | | Total light transmittance (%) | Polymerization concentration (wt %) | Uniformity of polymerization reaction | Thickness (μm) | Yellow index | Modulus (GPa) | Light transmittance (388 nm, %) |
|---|---|---|---|---|---|---|---|---|---|---|---|---|
| | TFMB | CBDA | 6FDA | BPDA | TPC | IPC | | | | | | | |
| Example 1 | 100 | 10 | 20 | — | 70 | — | 89.7 | 6 | ○ | 47 | 2.3 | 5.4 | 68.9 |
| Example 2 | 100 | 15 | 15 | — | 70 | — | 89.7 | 6 | ○ | 53 | 2.3 | 6.0 | 69.1 |
| Example 3 | 100 | 20 | 20 | — | 60 | — | 90.1 | 6 | ○ | 50 | 2.1 | 5.4 | 69.4 |
| Example 4 | 100 | 30 | 15 | — | 55 | — | 89.6 | 6 | ○ | 47 | 2.2 | 5.9 | 70.1 |
| Example 5 | 100 | 25 | 20 | — | 55 | — | 89.0 | 6 | ○ | 49 | 2.2 | 5.4 | 69.7 |
| Example 6 | 100 | 10 | 15 | — | 75 | — | 88.2 | 6 | ○ | 50 | 2.4 | 5.9 | 69.0 |
| Example 7 | 100 | 15 | 12 | — | 73 | — | 89.0 | 6 | ○ | 50 | 2.9 | 5.9 | 68.9 |
| Example 8 | 100 | 15 | 15 | — | 70 | — | 89.1 | 15 | ○ | 48 | 2.4 | 6.0 | 69.0 |
| Comparative Example 1 | 100 | 20 | 30 | — | 50 | — | 90.0 | 6 | ○ | 50 | 2.3 | 4.8 | 69.5 |
| Comparative Example 2 | 100 | 35 | 25 | — | 40 | — | 90.0 | 6 | ○ | 54 | 2.2 | 4.8 | 70.3 |
| Comparative Example 3 | 100 | 35 | 20 | — | — | 45 | 90.4 | 6 | ○ | 49 | 1.6 | 3.2 | 70.2 |
| Comparative Example 4 | 100 | 40 | 60 | — | — | — | 90.4 | 6 | ○ | 50 | 1.4 | 3.4 | 55.3 |
| Comparative Example 5 | 100 | — | 20 | 20 | 60 | — | 89.3 | 12 | ○ | 55 | 2.8 | 4.8 | 11.8 | substrate was separated from the substrate to obtain a polyamideimide film having a thickness of 50 μm.

Comparative Example 5

N,N-dimethylacetamide (DMAc) and 2,2'-bis(trifluoromethyl)-benzidine (TFMB) were added to a reactor under a nitrogen atmosphere, and the mixture was thoroughly stirred. Then, 4,4'-hexafluoroisopropylidene diphthalic anhydride (6FDA) was added thereto and stirred well until dissolved, and then, biphenyl tetracarboxylic dianhydride (BPDA) was added thereto and stirred well until dissolved. Then, terephthaloyl dichloride (TPC) was added thereto, and stirred for 6 hours, followed by dissolution and reaction, thereby preparing a polyamic acid resin composition. Here, It could be confirmed from Table 1 that Examples according to the present invention had excellent uniformity of polymerization reaction to have good film-forming properties, excellent total light transmittance, excellent light transmittance even in a short wavelength region, a low Yellow index (YI index), and a high modulus. On the other hand, it could be confirmed that Comparative Examples showed a low modulus, and thus, there is a limitation in increasing the modulus.

In particular, in Comparative Example 5, it could be confirmed that since Comparative Example 5 did not include the aromatic dianhydride and the cycloaliphatic dianhydride as the acid anhydride, the light transmittance in the short wavelength region was remarkably low.

The polyamideimide film according to the present invention may implement high light transmittance and a low Yellow index to have excellent optical properties while maintaining inherent physical properties of excellent mechanical properties, heat properties, and electrical properties.

In particular, since the polyamideimide film may have significantly excellent light transmittance generally in a wide range including not only a visible light total wavelength region but also a short wavelength region, thereby remarkably improving optical characteristics, and thus, the polyamideimide film is able to be applied to various display fields.

At the same time, since the modulus may be remarkably improved and excellent mechanical strength may be implemented, the polyamideimide film may be applied to various fields including a display, etc.

Hereinabove, although the present invention is described by limited Examples, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the claims to be described below as well as all modified equally or equivalently to the claims are intended to fall within the scopes and spirit of the present invention.

What is claimed is:

1. A polyamideimide film comprising:
   a polyamideimide resin derived from an aromatic diamine, wherein the aromatic diamine comprises 2,2'-bis(trifluoromethyl)-benzidine;
   an acid anhydride comprising an aromatic dianhydride and a cycloaliphatic dianhydride; and
   an aromatic diacid dichloride,
   wherein
   an amount of the aromatic diacid dichloride is more than 50 mol based on 100 mol of the aromatic diamine, and
   a molar ratio between the aromatic diacid dichloride and the aromatic dianhydride ranges from 2.50 to 7.00.

2. The polyamideimide film of claim 1, wherein the aromatic diacid dichloride includes any one or a mixture of two or more selected from the group consisting of terephthaloyl dichloride, isophthaloyl dichloride, 1,1'-biphenyl-4,4'-dicarbonyl dichloride, 1,4-naphthalene dicarboxylic dichloride, 2,6-naphthalene dicarboxylic dichloride, and 1,5-naphthalene dicarboxylic dichloride.

3. The polyamideimide film of claim 1, wherein the aromatic dianhydride is 4,4'-hexafluoroisopropylidene diphthalic anhydride, and the cycloaliphatic dianhydride is cyclobutane tetracarboxylic dianhydride.

4. The polyamideimide film of claim 1, wherein the aromatic diacid dichloride has a content of 55 to 90 mol with respect to 100 mol of the aromatic diamine.

5. The polyamideimide film of claim 1, wherein the polyamideimide film has a modulus of 5.0 GPa or more, measured at an extension rate of 25 mm/min using UTM 3365 manufactured by Instron.

6. The polyamideimide film of claim 5, wherein the polyamideimide film has a total light transmittance of 88% or more, and a Yellow index of 3.0 or less.

7. The polyamideimide film of claim 5, wherein the polyamideimide film has a light transmittance of 60% or more, measured at 388 nm.

8. The polyamideimide film of claim 1, wherein the polyamideimide film has a modulus of 5.0 GPa or more, measured at an extension rate of 25 mm/min using UTM 3365 manufactured by Instron, on a specimen having a thickness of 45 to 55 μm, a length of 50 mm, and a width of 10 mm.

9. The polyamideimide film of claim 8, wherein the polyamideimide film has a total light transmittance of 88% or more, and a Yellow index of 3.0 or less, based on a thickness of 45 to 55 μm.

10. The polyamideimide film of claim 8, wherein the polyamideimide film has a light transmittance of 60% or more, measured at 388 nm.

11. An image display device comprising the polyamideimide film of claim 1.

12. A polyamic acid resin derived from aromatic diamine, acid anhydride, and aromatic diacid dichloride,
   wherein the aromatic diamine includes 2,2'-bis(trifluoromethyl)-benzidine,
   the acid anhydride includes aromatic dianhydride and cycloaliphatic dianhydride,
   the aromatic diacid dichloride has a content of more than 50 mol with respect to 100 mol of the aromatic diamine, and
   a molar ratio between the aromatic diacid dichloride and the aromatic dianhydride ranges from 2.50 to 7.00.

13. A polyamideimide film comprising:
   a polyamideimide resin derived from an aromatic diamine, an acid anhydride, and an aromatic diacid dichloride,
   wherein
   the aromatic diamine comprises 2,2'-bis(trifluoromethyl)-benzidine,
   the acid anhydride comprises an aromatic dianhydride and a cycloaliphatic dianhydride,
   an amount of the aromatic diacid dichloride is more than 50 mol based on 100 mol of the aromatic diamine,
   a total light transmittance of the polyamideimide film is 88% or more, and
   a Yellow index of the polyamideimide film is 3.0 or less.

14. The polyamideimide film of claim 13, wherein the total light transmittance and the Yellow index are based on a thickness ranging from 45 μm to 55 μm.

* * * * *